July 15, 1958  H. C. LAIRD ET AL  2,843,152
COMBINED VALVE ACTUATING AND LOCKING MEANS
Filed Dec. 1, 1954
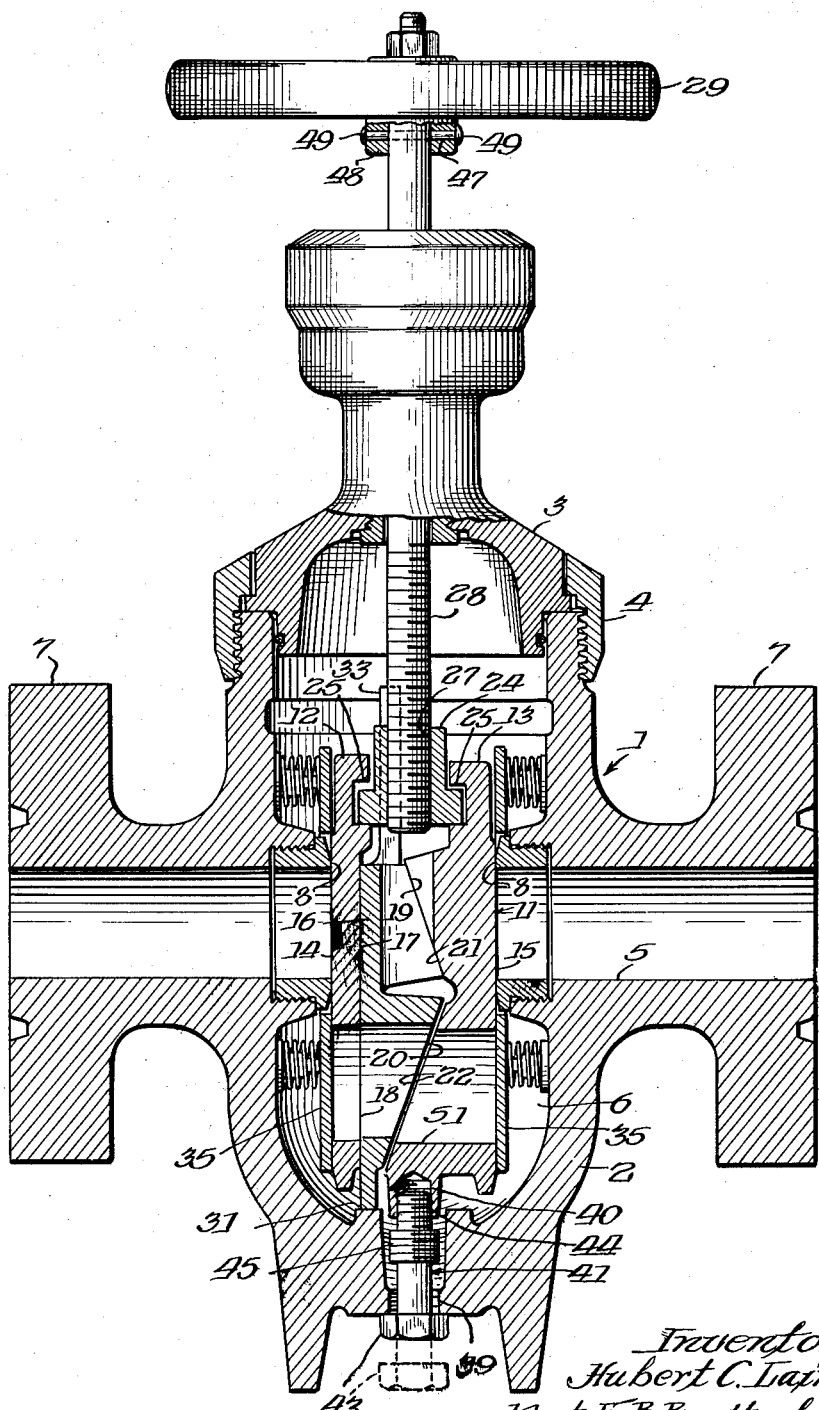
Inventors.
Hubert C. Laird, &
Kurt E. B. Bredtschneider
By Joseph O. Lange Atty.

United States Patent Office 2,843,152
Patented July 15, 1958

---

2,843,152

COMBINED VALVE ACTUATING AND LOCKING MEANS

Hubert C. Laird, Oak Park, and Kurt E. B. Bredtschneider, Chicago, Ill., assignors to Crane Co., Chicago, Ill., a corporation of Illinois Application December 1, 1954, Serial No. 472,499

3 Claims. (Cl. 137—797)

This invention relates to valves, and, more particularly, it pertains to means for securing valve closures in either the open or closed position of movement thereof against movement in the opposite direction for various purposes.

It is one of the purposes of the invention to provide means for securing or locking valve closures preferably in one limit of movement thereof so as to prevent valve operation by the use of the actuating mechanisms. This is of importance where it is essential that the valve not be tampered with or where vibration may tend to loosen or alter the position of the closure, especially where coarse or quick opening threads are employed for valve actuation. Where it is essential that certain valves not be operated except in rare circumstances or by authorized personnel only, the valves may be mounted through a partition or other structure or otherwise arranged so as to restrict or give limited access to the sides having the securing or locking elements.

Supplemental to the use of the locking means is the provision of a frangible connection such as a shear pin between the handwheel or other mechanism and the stem to protect the latter or other internal parts against breakage by turning the wheel or mechanism when the closure is in the locked position.

Another purpose for securing valve closures in the open or closed position is to provide for the repair of valves under pressure. It is a common experience by users of valves, especially where no frangible means such as a shear pin is employed between the handwheel and stem, to find broken valve stems as a result of operators applying bars to the handwheels and bearing down on valves for final tightening or in an effort to loosen the same when in effect they are applying force in the wrong direction and actually tightening the valves, thus exceeding the strength of the stems. According to the one concept of the present invention, if the stem fails when the closure member is near or substantially in the end limit of movement farthest from the actuating mechanism, depending on the exact type and use of the valve involved, the closure member may first be drawn into and then secured or simply secured, depending on the valve and use thereof, in substantially the end limit of movement in this direction by the use of special means of the invention so as to be in substantial sealed engagement with the valve seat or seats, thus permitting the valve to be opened at the top under full line pressure and the broken stem replaced. Or, packing and other parts such as bearings may be replaced in this manner or, the valve merely inspected with the valve under pressure. More extensive repairs including the replacement of the valve disc under pressure is treated in co-pending application Serial No. 472,591, filed December 2, 1954, now Patent Number 2,746,470. Where the valve stem fails with the closure member in a partly open position or where the closure member is immovable in such a position such arrangement is covered in co-pending application Serial No. 472,676, filed December 2, 1954. Where a shear pin is employed, the stem may still be broken by a workman inserting a non-frangible pin and continuing to bear down for tight seating or by taking off the handwheel and applying a wrench in an effort to open or close the valve.

Yet another purpose of the invention is to provide for valve operation in which the closure member is moved into light or reasonably tight engagement in the lowermost position by the use of the actuating stem and then drawn into fluid tight engagement with or further tightened against the valve seat or seats by the special means at the bottom or underside of the valve.

Other objects and advantages will become more readily apparent upon proceeding with the specification read in light of the accompanying drawing in which:

The single figure shows a longitudinal sectional view of a valve to which the invention has been applied.

Referring more particularly to the single figure of the drawing, the conduit type gate valve therein shown comprises a casing or housing 1 which is formed by a body 2 and a bonnet 3, the latter being secured on the body by means of the usual bonnet ring 4. A flow passage 5 extends through the body portion, being intersected by a valve chamber 6, the upper part of which extends within the lower part of the bonnet as shown. The body is flanged at each end at 7 for connection to a pipeline (not shown) as by clamping or bolting (also not shown).

Within the valve chamber, a valve disc or closure member generally designated 11 is mounted for reciprocal movement into the open and closed positions. As shown in the drawing, this closure member is made up of three parts, the outer valve parts 12 and 13 presenting plane parallel surfaces at 14 and 15 for sealed engagement with the parallel seat rings 8 within the body when the closure is in the upper or lower limits of movement. These seat rings may, of course, be integral with the body or, on the other hand floating or plunger type seat rings may be employed, the upstream ring being actuated against the valve disc which may be a flat plate of constant thickness by line pressure, the seat rings being sealed within the body by means of O-rings. As is apparent from the drawing figure, the intermediate or floating wedge part 16 of the valve disc illustrated has a vertical surface 17 in engagement with the inner vertical surface 18 of the valve part 12, while presenting upper and lower flat wedge surfaces at 19 and 20 for engagement with complementary wedge surfaces 21 and 22 of the valve part 13. The inner wedge member floats or is carried along with the outer disc parts during the reciprocal movement of the closure member, the latter outer disc parts being connected to a T-head or nut member 24, receiving the latter member in the recesses 25 of those parts.

The nut member is internally threaded at 27 for receiving the threaded valve stem 28 which is mounted through the top of the bonnet for rotation therewithin by means of the handwheel 29. The valve stem is of the non-rising type, the mounting details through the upper part of the bonnet not being shown. It should also be noted that the intermediate wedge member 16 as well as the valve disc member 13 are hollowed out in the center for reception therewithin of the end of the non-rising stem as the latter effects upward movement of the closure member from the closed position shown to the uppermost open valve position. The upper wedge surfaces 19 and 21 are therefore each divided into co-planar portions on each side of the stem recess.

The closure member is arranged for expansion sidewardly by means of the interengaging wedge surfaces above referred to when in the extreme lowermost position (shown) or in the uppermost position. This expansion provides fluid tight sealing with the valve seats and is effected in the downward direction by the intermediate wedge member 16 contacting the stop 31 in the lower end of the body and the outer members 12 and 13 being moved downwardly past the wedge member by the action of the nut and stem, thereby providing wedging action between the upper wedge surfaces 19 and 21. In the upward direction, the spaced portions 33 on each side of the wedge member (only one being shown in the drawing) contact the top of the valve chamber, halting progress while the outer members are continued in their movement forming a wedging action between the inclined surfaces 20 and 22 and for expansion in the opened position. To complete the assembly, resiliently mounted wiping plates 35 are provided one on each side of the closure member, being relieved for protrusion therethrough of the valve seats, the said wiping plates being resiliently held in contact with the outer flat surfaces 14 and 15 of the closure member for wiping excess lubricant from these faces and preventing leakage within the flow passage 5 in the body.

In the lower part or bottom of the body, a threaded opening 39 is provided which is oppositely disposed relative to and in line with the closure member actuating mechanism or the valve stem 28 thereof. The closure member, or more particularly the stem actuated outer part 13 thereof, is provided with a threaded recess or socket 40 which is inwardly of the opening 39 and in substantial axial alignment therewith, but being of a smaller diameter than this opening. Within the opening 39 and extending into the valve chamber is a securing or locking element generally designated 41. This element is provided with threading at the upper or inner end thereof for engagement within the recess 40 of the closure member in the secured or locked position shown in the drawing. The securing element has an enlarged portion, shown as a polygonal head 43 in the figure, which preferably bears against the outer surface of the body in the upper or innermost closure engaged position of the element, thus permitting the latter to draw the closure member into tight secured relation by means of the threaded engagement within the socket 40 and upon rotation of the element through the polygonal head thereof.

When it is desired to unlock the closure member, the securing element is turned in the opposite direction so as to break the bearing contact between the upper surface of the head and valve body and disengage the threaded end 44 from the recess 40 in the closure. To retain the securing element in a position withdrawn from the closure member so as not to interfere with actuation thereof by the handwheel and stem, a threaded portion 45 of larger diameter is provided below the end portion for engagement within the threaded opening 39 of the body when the element is further rotated in the downward or outward direction. When so engaged within the opening 39, the said element further serves as a plug for the opening during valve actuation.

The present construction therefore provides for effective securing or locking of the closure member in the lowermost expanded position where it is important, for example, that the valve not be inadvertently changed or tampered with or where vibration may tend to loosen or alter the position of the closure. As pointed out in the preamble, where it is essential that certain valves not be operated except in rare circumstance or by authorized personnel only, the valves may be mounted through partitions or other structures or otherwise arranged so as to restrict or give limited access to the side having the securing or locking elements.

To safeguard valves of this type against damage or breakage in the event a bar is applied to the handwheel and force exerted in an effort to actuate the valve when perhaps unknowingly the locking feature is present and applied, it is preferred to employ a frangible connection between the handwheel and valve stem which will fail rather than the stem or other parts of the valve. Accordingly, a shear pin 47 is provided which passes transversely through the hub portion 48 of the handwheel and the upper part of the valve stem, being secured as by peening at each end at 49 to prevent withdrawal of the pin except on fracture.

It should be evident where the valve closure is moved sufficiently towards the lower end to permit the top threads of the securing element to catch hold of the threads of the socket in the closure member when the securing element is unscrewed from the valve body and raised into contact with the closure that the closure may be drawn into the lowermost fluid sealed expanded condition by applying a wrench or the like to the head portion of the element and continuing to rotate the same until tight. Thus, the closure member can be moved near the lowermost position or merely into light engagement in this direction by the use of the handwheel and valve stem and then pulled or drawn into tight engagement in this direction by the use of the securing element, instead of merely securing the closure in this condition when placed therein by use of the valve stem, for an alternate method of operation. The present invention and the expression "securing the closure member in substantially the end limit of movement opposite the actuating means" or valve stem envisages and is intended to include both of these variations in the basic operation of the valve which is to advance the closure from one end and to secure or lock the same from the opposite direction, whether there is actually supplemental valve movement or tightening from this opposite direction or not.

The present invention is also applicable to the repair of valves under pressure. As indicated in the preamble, it is a common occurrence for workmen or valve operators to apply lever bars to the handwheel and bear down in an effort to get tight seating of the valve often exceeding the strength of the valve stem where no shear pin is employed or, if such a pin is provided and it shears workers often replace the same with a non-frangible pin or applied a wrench directly to the stem after removal of the handwheel and continued to apply force in an effort to open or close the valve which may also exceed the strength of the stem and cause failure thereof. In a non-rising stem type of valve which does not indicate in what position the closure is, that is, whether open or closed, the operator may be trying to loosen and open the valve, whereas actually he is applying force in the wrong direction and tightening the same, to produce stem failure.

In such a case where the stem has been broken with the closure member in the lowermost expanded closed position, the valve may be repaired under pressure to the extent of replacing the valve stem or for that matter packing or other parts thereabove by screwing the securing element 41 of this invention inwardly into tight abutting contact with the bottom of the body and tight engagement within the threaded recess 40 of the closure member so as to lock the closure in that position. The valve may then be disassembled at the top and the broken stem replaced or other repairs made. If desired, a threaded plug may be ordinarily provided within the opening 39 in the body which may be removed in case of valve failure and a separate securing or locking element in the nature of a simple bolt inserted in the opening and screwed up into abutting contact with the exterior of the body and tight engagement within the threaded recess or socket 40 in the lower part of the valve disc.

It should be evident that if the closure member should be near or approximately in the lower position when stem failure occurs as a result of pre-wedging for instance that the insertion of the lock element within the threaded socket and tightening of the element will draw the closure member any remaining distance downwardly and into tight engagement in substantially the lowermost expanded position for subsequent repair of the valve in the manner previously covered. In the case of valve stem failure when the closure member is in a partly open or partly closed position or where there is failure or injury to the valve disc or nut member, see the co-pending cases referred to in the preamble.

Although the valve disc presently shown provides a flow passage 51 in the lower part for alignment with the flow passage 5 in the body when the closure is in the upper expanded position, it should of course be understood that gate valves may be provided in which the passage is in the upper part of the closure member and will align with the passage in the body when the closure is in the lowermost expanded position. It should also be understood that the principles of this invention may be applied to a valve having a plate type closure of constant thickness or to gate valves which are not of the conduit type, such as double disc gate valves, and those having solid wedges. Further, it may be desired to provide a lock-down feature in a globe type valve or others having reciprocally movable closure members in which case the locking element may be made longer so as to extend into engagement in the closure member. In some instances, it may be desired to secure a swing type closure member.

It should be evident that other details from that shown may be availed of regarding the securing element, as for instance instead of the integral construction shown which is of generally bolt form, a member which is threaded at both the top and bottom may be employed which may first be turned into engagement within the closure member and along which a wing nut portion may be turned into abutting contact with the bottom of the bonnet and then tightened, drawing the threaded shank portion of the member and the closure downwardly into tight, locked engagement. In the locked position, the wing nut serves the same purpose as the enlarged head portion of the illustrated form in that it prevents inward movement of the member and corresponding movement of the closure member.

The present valve showing and others suggested are therefore only illustrative of the application and use of the present invention in various forms and details of construction, it being desired that the broad concept of the invention be restricted only by the appended claims, read within the spirit of the invention.

We claim:

1. The combination comprising a valve casing, a reciprocally movable divided closure member therewithin, said closure member comprising two adjacent portions relatively movable to each other having inclined surfaces therebetween, means for normally actuating the closure member including a valve stem extending into the casing, said casing having an opening oppositely disposed to said valve stem and said closure member being provided with a threaded portion inwardly of the opening on one of the adjacent portions thereof, means extending through the opening in the casing having a portion in abutting contact with the exterior of the casing and a threaded portion, said latter threaded portion engaging said threaded portion of the closure portion and being effective to take up any movement by drawing of one of the adjacent portions of the closure member along the inclined surface on the other adjacent portion and to secure the closure member in tight engagement against the valve casing and hold it against substantial endwise movement.

2. The subject matter of claim 1, said actuating means including means for rotating the valve stem and frangible means between the valve stem and means for rotating the same.

3. The combination comprising a valve casing, a reciprocally movable divided closure member therewithin, said closure member comprising two adjacent portions relatively movable to each other having inclined surfaces therebetween, means for normally actuating the closure member including a valve stem extending into the casing, said casing having an opening oppositely disposed to said valve stem and said closure member being provided with a threaded portion inwardly of the opening on one of the adjacent portions thereof, means extending through the opening in the casing having a portion in abutting contact with the exterior of the casing and a threaded portion, said latter threaded portion engaging said threaded portion of the closure portion and being effective to secure the closure member in tight engagement against the valve casing and hold it against substantial endwise movement by bearing of one of said adjacent portions on the inclined surface on the other.

References Cited in the file of this patent

UNITED STATES PATENTS

| | | |
|---|---|---|
| 1,587,245 | Smith | June 1, 1926 |
| 1,898,935 | Brandriff | Feb. 21, 1933 |
| 2,002,780 | Laurent | May 28, 1935 |
| 2,249,848 | O'Brien | July 22, 1941 |
| 2,258,335 | Moore | Oct. 7, 1941 |
| 2,478,811 | Downs | Aug. 9, 1949 |
| 2,523,826 | Heinzelman | Sept. 26, 1950 |

FOREIGN PATENTS

| | | |
|---|---|---|
| 16,296 | Great Britain | Sept. 14, 1889 |
| 2,451 | Great Britain | Dec. 9, 1893 |